Sept. 29, 1936.  A. J. FAUSEK ET AL  2,056,042
VALVE
Filed Dec. 1, 1933
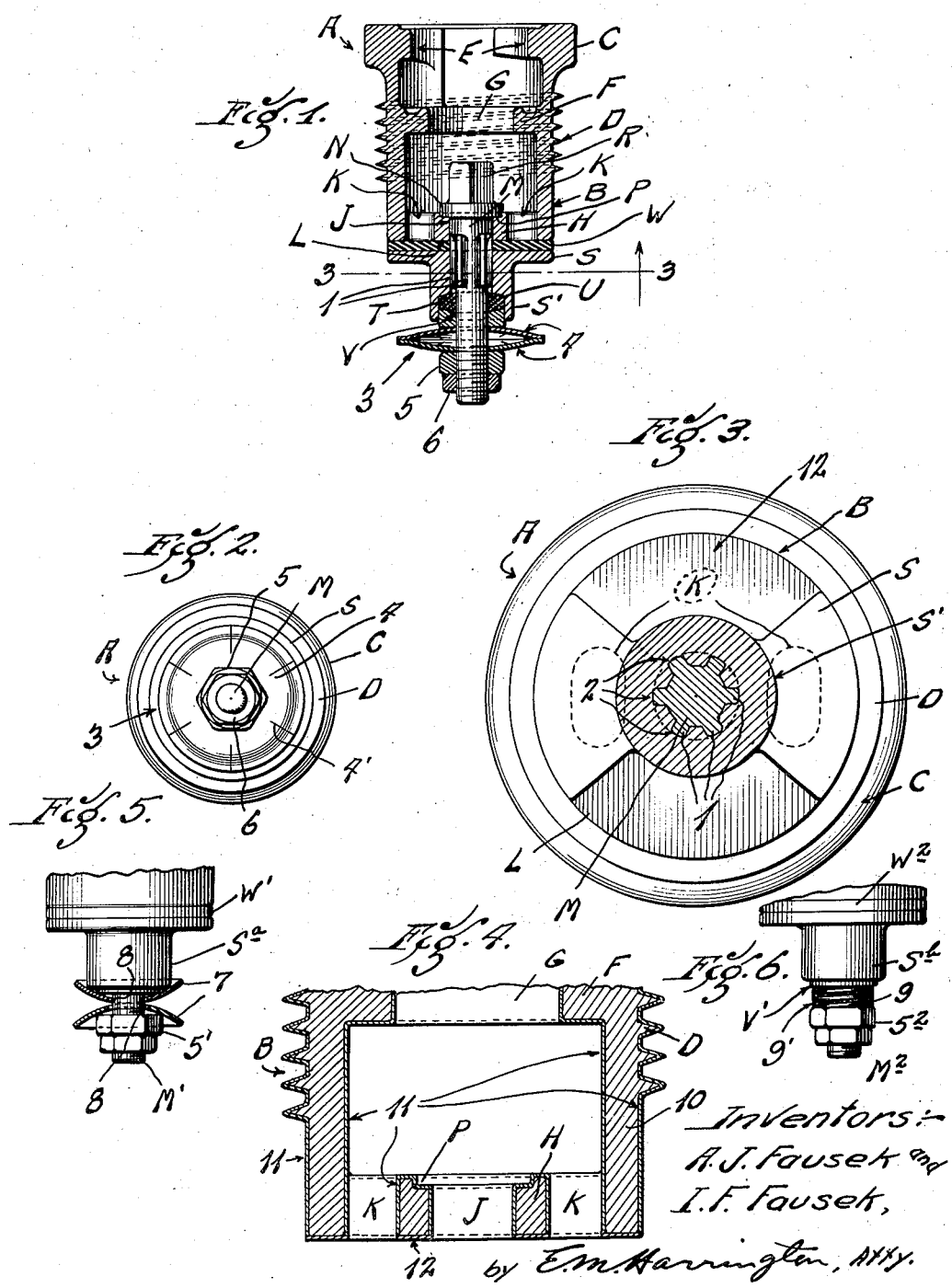
Inventors:-
A. J. Fausek and
I. F. Fausek,
by E. M. Harrington, Atty.

Patented Sept. 29, 1936

2,056,042

UNITED STATES PATENT OFFICE 2,056,042

VALVE

Arthur J. Fausek and Irwing F. Fausek,
Clayton, Mo.

Application December 1, 1933, Serial No. 700,511

3 Claims. (Cl. 251—84)

This invention relates generally to valves, and more particularly to valves of the type known as lager valves extensively used in association with kegs, barrels, and other receptacles from which beer is dispensed, the predominant object of the invention being to provide an improved valve of this type which is so constructed and produced that it is capable of performing its intended function in a much more efficient manner than was possible in the use of lager valves as produced prior to this invention.

Valves of the type to which this invention relates are usually made of brass, and each thereof includes a housing having liquid discharge openings formed through one of its walls. Also each of these valves includes a rotary valve element which is movable to positions where the liquid discharge openings are opened or closed to permit passage of liquid therethrough, and a rubber facing element is fixedly associated with the rotary valve element and moves therewith in contact with a face of the valve housing at which ends of the liquid discharge openings are located. Due to the fact that the metal of which the valve is made may not be exposed to the beer within a receptacle with which the valve is associated, it has been the practice in the past to coat the entire metallic structure of the valve with tin or other suitable material, such coating being accomplished usually by dipping the metallic structure of the valve in hot tin or other suitable metal.

Because the entire metallic structure of the valves heretofore was coated with tin or other metal, the face of the valve housing with which the rubber facing element of the rotary valve element contacted was so coated, and this situation caused a great amount of trouble and annoyance in the use of lager valves as produced prior to this invention. This trouble and annoyance arose from the fact that sulfur in the rubber of which the facing element was formed would bloom out of said rubber, and the adjacent tin-coated face of the valve housing with which the rubber facing element contacted would react to the presence of the sulfur in a manner to cause said face to become roughened. The roughened face referred to and the presence of sulfur in contact with said face caused the rubber facing element of the rotary valve element to adhere to the adjacent face of the valve housing with such tenacity as to prevent rotation of the rotary valve element without destroying the usefulness of the rubber facing element.

We have discovered that certain metallic coatings may be applied to the face of the valve housing with which the rubber facing element contacts which are not in the least degree affected by the presence of sulfur, and therefore no sticking of the facing element and the adjacent face of the valve housing results. While we do not wish to be limited to the use of any particular coating material, we have found that when the face of the valve housing with which the rubber facing element contacts is chrome plated such face does not in any manner react to the presence of sulfur so as to cause roughening of the plated face, or sticking of the facing element and the plated face. Stainless steel or nickel plating also may be used for the purpose of coating the face of the valve housing under consideration.

It is not feasible to chrome plate the entire metallic structure of the valve, due to the fact that the expense incident to such procedure would be prohibitive. Also, chrome plating does not lend itself very well to coating a structure such as a valve of the type disclosed in this application, where the coating material must follow numerous irregularities in the coated surface and enter various depressions and openings in said coated surface. On the other hand, the process of coating with tin lends itself admirably to our present needs, with respect to all parts of the valve structure other than the face thereof with which the rubber facing element contacts, inasmuch as the tin coating (especially when it is applied in accordance with the hot dipping process) follows in a precise manner all irregularities of the coated surface.

In view of the foregoing, we have produced an improved valve in accordance with the present invention which, briefly stated, involves coating or plating the entire metallic valve structure, other than the face with which the rubber facing element contacts, with tin or other material which may be applied economically, successfully, and conveniently and plating or coating the face with which the rubber facing element contacts with a material which will not be roughened or otherwise affected by the presence of sulfur. In this manner we produce a valve which, because of its improved construction and arrangement, eliminates entirely the trouble and annoyance with which users of valves of this type were faced prior to this invention. Also, this result is attained without greatly increasing the cost of producing valves of this type over the costs of producing similar valves prior to this invention.

Another object of the invention is to provide an improved arrangement for connecting the rotary valve element of the valve to the stem by which same is rotated.

Still another object of the invention is to provide improved resilient means for forcing the rubber facing element which is associated with the rotary valve element of the valve against its seat.

Fig. 1 is a vertical sectional view of a valve made in accordance with this invention. In this view, which is full size, no attempt has been made to show the thin coatings of metallic material on the metallic parts of the valve structure, this showing being made in Fig. 4, which is greatly enlarged and more or less diagrammatical.

Fig. 2 is an inverted plan view of the valve illustrated in Fig. 1.

Fig. 3 is an enlarged cross-section taken on line 3—3 of Fig. 1, and looking in the direction indicated by the arrow.

Fig. 4 is an enlarged and more or less diagrammatical fragmentary vertical section of the valve housing showing the coatings of metallic materials applied thereto.

Fig. 5 illustrates a modied form of the means for causing the rubber facing element of the rotary valve element of the valve to contact closely with its seat.

Fig. 6 illustrates another modified form of the means shown in Fig. 5.

In the drawing, wherein are shown for the purpose of illustration, merely, several embodiments of the invention, A designates the improved valve generally. The valve A includes a valve housing B, which preferably is of cylindrical shape and has an annular flange portion C at its outer end. The valve housing B is provided with screw-threads D on its circumferential face, which serve to permit the valve housing to be screwed into an opening formed in a wall of a keg, barrel, or other receptacle (not shown). Within the upper portion thereof the valve housing B is provided with inwardly extended portions E shaped and arranged to provide the socket portion of a bayonet joint that receives a properly shaped portion of a fitting (not shown), which is adapted to be connected to the valve housing. The valve housing B also includes a transversely extended wall F through which a centrally arranged opening G is formed. The valve housing A includes a bottom wall H through which a central opening J is formed. This bottom wall is also provided with liquid-discharge openings K, which are formed therethrough, said liquid-discharge openings being open at the bottom face L of said bottom wall.

Extended through the central opening J formed through the bottom wall H of the valve housing B is a valve stem M, which is provided with an annular flange portion N that is seated in a cavity P formed in the top face of the bottom wall H of the valve housing. The valve stem is also provided with a non-circular portion R which is adapted to receive a suitably shaped portion of the fitting already referred to herein, which is connected to the valve housing, whereby said valve stem may be rotated. Fixedly mounted on the valve stem M is a rotary valve element S which is provided with a downwardly extended sleeve portion S' through which the valve stem passes. The sleeve portion S' of the rotary valve element is provided with a cavity T at its lower end in which packing material U is disposed around the valve stem M, a gland V being arranged within the lower portion of the cavity T in contact with the packing material U whereby said packing material may be compressed so as to provide a fluid-tight joint around the valve stem M. Secured to the rotary valve element S and interposed between the top face thereof and the lower face L of the bottom wall H of the valve housing B is a rubber facing element W. This rubber facing element moves with the rotary valve element and with respect to the lower face L of the bottom wall H of the valve housing so as to provide a fluid-tight joint between said rotary valve element and said face L.

In order to mount the rotary valve element S on the valve stem so that said element and stem will rotate together, we form on said valve stem a plurality of teeth-like projections or splines I, as shown most clearly in Figs. 1 and 3. The inner face of the opening through the sleeve portion S' of the rotary valve element S is provided with depressions 2 which receive the teeth-like projections I, and in this manner the rotary valve element is arranged on the valve stem so as to be incapable of independent rotation with respect thereto. By forming a number of relatively small teeth-like projections I on the valve stem the task of producing the valve stem is greatly simplified, as the amount of material removed from the valve stem in forming the teeth-like projections is much less than has been the case heretofore when considerable material of the valve stem was removed to provide the valve stem with flat portions of substantial dimensions. Also, the connection between the valve stem and the rotary valve element is much more durable when a number of teeth-like projections are employed than was the connection obtained in the use of flat faces formed on the valve stem and rotary valve element.

So as to insure close contact between the rubber facing element W and the lower face L of the bottom wall of the valve housing B, even when the thickness of said rubber facing element is reduced through wear or otherwise, we employ resilient means 3 which serves to force the rotary valve element S and the rubber facing element W upwardly toward said lower face L. The form of resilient means illustrated in Figs. 1 and 2 comprises a pair of disks 4 which are formed of resilient material. The disks 4 are more or less dish-shaped, said disks being in contact with each other at their circumferential edges and being bowed outwardly in opposite directions with respect to each other. The disks 4 are provided with alined, centrally located openings through which the valve stem M passes, and nuts 5 and 6 are screwed on the lower end of the valve stem for placing the associated disks under compression, the nut 5 contacting with the lower disk 4 and the nut 6 serving as a lock nut for the nut 5. Due to the fact that the associated disks are under compression as described, the rotary valve element will be forced upwardly by said disks in a manner to force the rubber facing element W into close contact with the lower face L of the bottom wall of the valve housing, even though the thickness of the rubber facing element is reduced because of wear or otherwise. It is obvious that the connection provided between the rotary valve element and the valve stem by the teeth is loose enough to permit the valve element to move longitudinally of the valve stem.

In Figs. 5 and 6 we illustrate modified forms of the means just described. In Fig. 5 a pair of dish-shaped, resilient disks 7 are employed, which contact with each other at the central portions thereof. The disks 7 are provided with central openings 8 formed therethrough, through which the valve stem M' extends, and the outer portions of said disks contact respectively with the lower end of the rotary valve element $S^a$ and the nut 5' which is screwed on the lower end of the valve stem M'. In the operation of the means shown in Fig. 5, the associated disks 7 being placed under compression by the nut 5' will force the rotary valve element $S^a$ upwardly so as to maintain close contact between the rubber facing element W' and the lower face of the bottom wall of the valve housing.

In Fig. 6 we provide a coil spring 9 which surrounds the valve stem $M^2$ and is interposed under compression between the gland V' and a nut $5^2$ screwed on the lower end portion of the valve stem. The coil spring tends to move the gland V' upwardly, and this movement is transmitted to the rotary valve element $S^b$, whereby the rubber facing element $W^2$ is forced into close contact with the lower face of the bottom wall of the valve housing.

Considering now the feature of the invention which involves providing the valve housing B of the valve structure with a face that will not be affected by sulfur which blooms out of the rubber facing element W associated with the rotary valve element S, attention is called to Fig. 4 of the drawing. In this view the body of the valve housing B is indicated by the reference character 10, and, of course, the valve housing shown in Fig. 4 includes the screw-threads D, the transverse wall F, the opening G formed in said transverse wall, the bottom wall H, the central opening J, the liquid-discharge openings K formed through said bottom wall, and the cavity P at the upper portion of the bottom wall adjacent to the central opening J, already referred to herein. In producing the valve housing in accordance with this invention, said valve housing is coated or plated throughout, with the exception of the lower face L of the bottom wall H thereof, with tin or some other suitable material, as indicated at 11 in Fig. 4. We have found that an excellent method of providing the valve housing with a coating of tin is by employing the hot dipping process, as when this method is followed the coating of tin is deposited in the form of a smooth layer which follows in a very precise manner all irregularities of the coated surface. The lower face L of the bottom wall H of the valve housing is chrome plated, or is provided with a coating of any other material which is not affected by the presence of sulfur in the manner hereinbefore described, the coating on the face L being designated by the reference character 12 in Fig. 4. The order in which the coatings 11 and 12 are applied to the valve housing is immaterial, as the coating 12 may be applied either before or after the application of the coating 11.

When the valve housing has been prepared as described, said valve housing is capable of performing its function in a very efficient manner, inasmuch as the face thereof with which the rubber facing element W contacts is characterized by being unaffected by the presence of sulfur which blooms out of the rubber of said facing element. This means that the face L of the valve housing will always be smooth and flat, and there will be no sticking of the rubber facing element on said face. Also, this result is attained with very little additional expense, as the cost of chrome plating the rather small face L of the valve housing is very little.

If desired the disks 4 may be provided with radial slits 4', as shown in Fig. 2, for the purpose of giving greater resiliency to said disks. Also we may fill in the coil spring 9 (Fig. 6) between the coils thereof with rubber compound 9' for the purpose of excluding beer from between said coils. By using rubber compound for this purpose the resiliency of the coil spring is not affected by the filling between the coils thereof.

While we described our improved valve as being adapted particularly for use as a lager valve, it is to be understood that it is not limited to this use, and may be employed in many situations where it is desired to withdraw liquids other than beer from receptacles in which said liquids are contained.

We claim:

1. A valve comprising a valve housing having a wall through which a liquid-discharge aperture is formed, a rotary valve element for controlling passage of liquid through said liquid-discharge aperture, said rotary element comprising a disk portion arranged in contact with said apertured wall of the valve housing and a sleeve portion extended from a face of said disk portion with the axis of the sleeve portion disposed perpendicularly with relation to the plane of the disk portion, a valve stem on which said rotary valve element is mounted, said valve stem being extended through said disk portion and said sleeve portion of said rotary valve element and having an enlarged portion which provides a shoulder that contacts with a face of said apertured wall of the valve housing, packing means for preventing leakage of fluid through said sleeve portion of said rotary valve element, a member removably mounted on said valve stem, and resilient means for forcing said rotary valve element into close contact with said apertured wall of said valve housing in order to insure fluid-tight contact therebetween, said resilient means comprising a pair of disks arranged under compression between said removable element on the valve stem and a part of said packing means whereby in addition to forcing the rotary valve element against said apertured wall of the valve housing said resilient means forces said packing means into its sealing position.

2. A valve comprising a valve housing having a wall through which a liquid-discharge aperture is formed, a rotary valve element for controlling passage of liquid through said liquid-discharge aperture, said rotary element comprising a disk portion arranged in contact with said apertured wall of the valve housing and a sleeve portion extended from a face of said disk portion with the axis of the sleeve portion disposed perpendicularly with relation to the plane of the disk portion, a valve stem on which said rotary valve element is mounted, said valve stem being extended through said disk portion and said sleeve portion of said rotary valve element and having an enlarged portion which provides a shoulder that contacts with a face of said apertured wall of the valve housing, packing means for preventing leakage of fluid through said sleeve portion of said rotary valve element, a member removably mounted on said valve stem, and resilient means for forcing said rotary valve element into close contact with said apertured wall of said valve housing in order to insure fluid-tight contact therebetween, said resilient means comprising a pair of dish-shaped disks arranged under compression between said removable element on the valve stem and a part of said packing means whereby in addition to forcing the rotary valve element against said apertured wall of the valve housing said resilient means forces said packing means into its sealing position.

3. A valve comprising a housing having a wall through which a liquid discharge aperture is formed, a rotary valve element for controlling the passage of liquid through said liquid discharge aperture, said rotary valve element comprising a disk portion arranged in contact with said apertured wall of the valve housing and a sleeve portion extending from a face of said disk portion with the axis of the sleeve portion disposed perpendicularly with relation to the plane of the disk portion, a valve stem on which said rotary valve element is mounted, said valve stem being extended through said disk portion and said sleeve portion of said rotary valve element and having an enlarged portion which provides a shoulder that contacts with a face of said apertured wall of the valve housing, packing means for preventing leakage of fluid through said sleeve portion of said rotary valve element, said packing means including a portion of said sleeve which provides the housing of the packing means and packing material within said sleeve portion, a member removably mounted on said valve stem, and resilient means for forcing said rotary valve element into close contact with said apertured wall of the valve housing in order to insure fluid-tight contact therebetween, said resilient means comprising a pair of disks arranged under compression between said removable element on the valve stem and a part of said packing means.

ARTHUR J. FAUSEK.
IRWING F. FAUSEK.